(12) United States Patent
Tan

(10) Patent No.: US 9,352,880 B2
(45) Date of Patent: May 31, 2016

(54) MULTI-ORIENTATION, REUSABLE CARRIER ASSEMBLY

(71) Applicant: Pan Pacific Plastics Mfg., Inc., Hayward, CA (US)

(72) Inventor: Hin Siang Michael Tan, San Ramon, CA (US)

(73) Assignee: Pan Pacific Plastics MFG., Inc., Hayward, CA (US)

( * ) Notice: Subject to any disclaimer, the term of this patent is extended or adjusted under 35 U.S.C. 154(b) by 37 days.

(21) Appl. No.: 14/084,886

(22) Filed: Nov. 20, 2013

(65) Prior Publication Data

US 2014/0140641 A1 May 22, 2014

Related U.S. Application Data

(60) Provisional application No. 61/728,551, filed on Nov. 20, 2012.

(51) Int. Cl.
*B65D 33/06* (2006.01)
*A45C 13/26* (2006.01)
*A45C 11/20* (2006.01)

(52) U.S. Cl.
CPC ............... *B65D 33/06* (2013.01); *A45C 13/26* (2013.01); *A45C 11/20* (2013.01); *Y02W 30/807* (2015.05)

(58) Field of Classification Search
CPC ......... A47J 47/145; A45C 3/00; A45C 11/20; A45C 13/02; A45C 13/26; B65D 81/3897; B65D 33/06; Y02W 30/807
USPC ........................................ 383/15, 16, 4, 8, 21
See application file for complete search history.

(56) References Cited

U.S. PATENT DOCUMENTS

| | | | | |
|---|---|---|---|---|
| 1,308,263 A | * | 7/1919 | Smith | 383/16 |
| 2,577,670 A | * | 12/1951 | Adams | 190/111 |
| 3,019,952 A | * | 2/1962 | Brewster | 294/142 |
| 3,792,806 A | * | 2/1974 | Layton | 294/152 |
| 4,062,392 A | * | 12/1977 | Ishii | 383/2 |
| D258,035 S | * | 1/1981 | Fenwick | D6/603 |
| 4,466,517 A | * | 8/1984 | Spiegelman | 190/8 |
| 4,578,814 A | | 3/1986 | Skamser | |
| 4,802,233 A | * | 1/1989 | Skamser | 383/15 |
| 4,805,776 A | * | 2/1989 | Namgyal et al. | 206/523 |
| 4,806,736 A | | 2/1989 | Schirico | |
| 4,812,054 A | * | 3/1989 | Kirkendall | 383/110 |
| 5,361,951 A | * | 11/1994 | Chehebar | 224/153 |
| D398,082 S | * | 9/1998 | Martz | D30/109 |
| 5,800,061 A | * | 9/1998 | Volles | 383/15 |

(Continued)

*Primary Examiner* — J. Gregory Pickett
*Assistant Examiner* — Peter Helvey
(74) *Attorney, Agent, or Firm* — Beyer Law Group LLP

(57) ABSTRACT

A multi-orientation, reusable carrier assembly having a carrier base defined by a first wall, a second wall, and surrounding side walls extending between the first and second wall. One side wall is a support wall oriented generally opposite a receiving opening into the receiving cavity thereof. The carrier assembly further includes a retaining strap having a first mount mounted to the second wall at a location thereof proximate to the receiving opening. The retaining strap includes a retaining handle associated with the support wall for retainment thereof in a first gripping position, centrally above the first wall, for carrying of the carrier base in a horizontal orientation. A retaining portion extends vertically across the opening, when the retaining handle is in the first gripping position and the carrier base is in the horizontal orientation, such that a retail container is substantially prevented from falling out through the opening.

19 Claims, 6 Drawing Sheets

(56) References Cited

U.S. PATENT DOCUMENTS

| | | | |
|---|---|---|---|
| 5,863,088 A * | 1/1999 | Kelly et al. | 294/146 |
| 5,892,202 A * | 4/1999 | Baldwin et al. | 219/387 |
| 5,947,884 A | 9/1999 | Gotoh et al. | |
| 6,053,634 A * | 4/2000 | Kay | 383/4 |
| D430,993 S | 9/2000 | Nottingham et al. | |
| 6,281,477 B1 | 8/2001 | Forrester et al. | |
| D449,441 S * | 10/2001 | Jackson et al. | D3/276 |
| 6,390,345 B1 * | 5/2002 | Brown et al. | 224/578 |
| 6,471,065 B1 | 10/2002 | Peeples et al. | |
| D481,539 S * | 11/2003 | Martz | D3/279 |
| 6,936,791 B1 * | 8/2005 | Baldwin et al. | 219/387 |
| 7,034,254 B2 * | 4/2006 | Grabowski et al. | 219/387 |
| 7,055,876 B2 | 6/2006 | Woldekidan | |
| 7,066,647 B2 * | 6/2006 | Peska | 383/40 |
| D531,458 S * | 11/2006 | Lown et al. | D7/605 |
| 7,153,025 B1 * | 12/2006 | Jackson et al. | 383/2 |
| D537,632 S * | 3/2007 | Quansah | D3/303 |
| D593,752 S * | 6/2009 | de Natale | D3/303 |
| 7,597,478 B2 * | 10/2009 | Pruchnicki et al. | 383/40 |
| D640,055 S * | 6/2011 | Mailet | D3/276 |
| D641,162 S * | 7/2011 | Houston et al. | D3/283 |
| D641,254 S | 7/2011 | Sela | |
| D665,899 S * | 8/2012 | Authier et al. | D23/410 |
| D683,137 S * | 5/2013 | Davis | D3/315 |
| 8,584,893 B2 * | 11/2013 | Durham | 220/754 |
| D719,353 S * | 12/2014 | Tan | D3/315 |
| 8,936,172 B2 * | 1/2015 | Hicks | 220/592.2 |

* cited by examiner

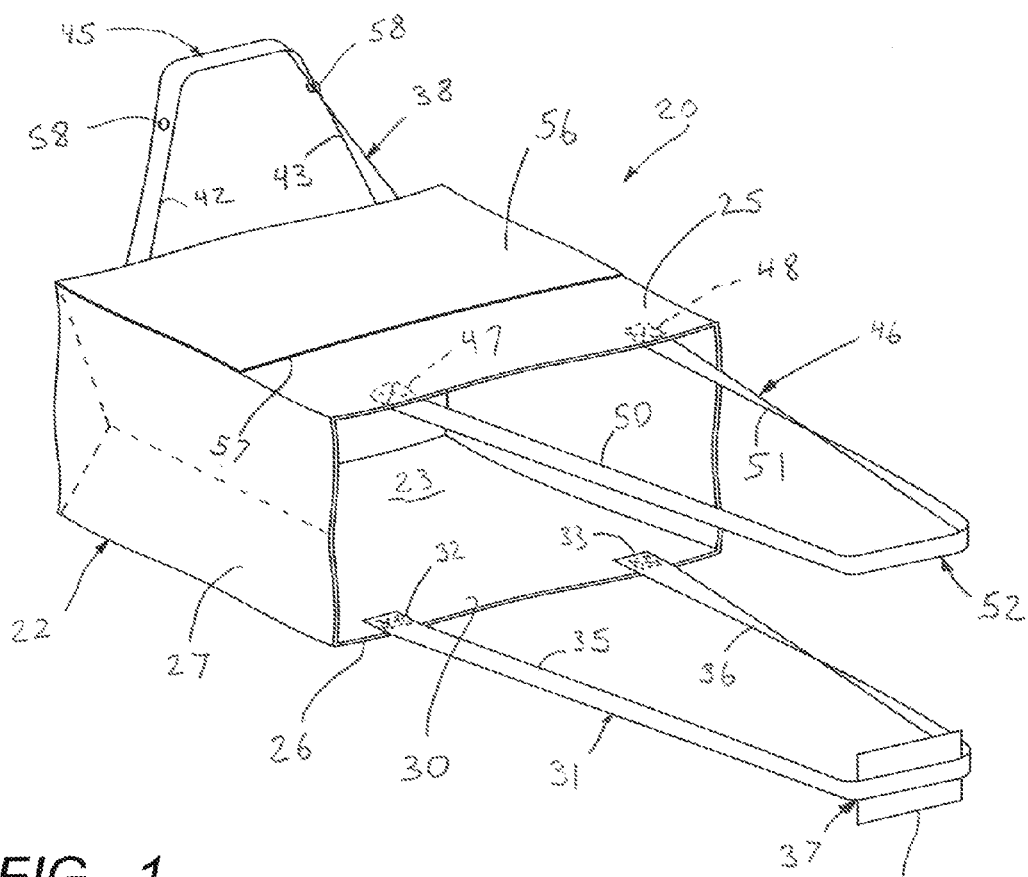
FIG._1
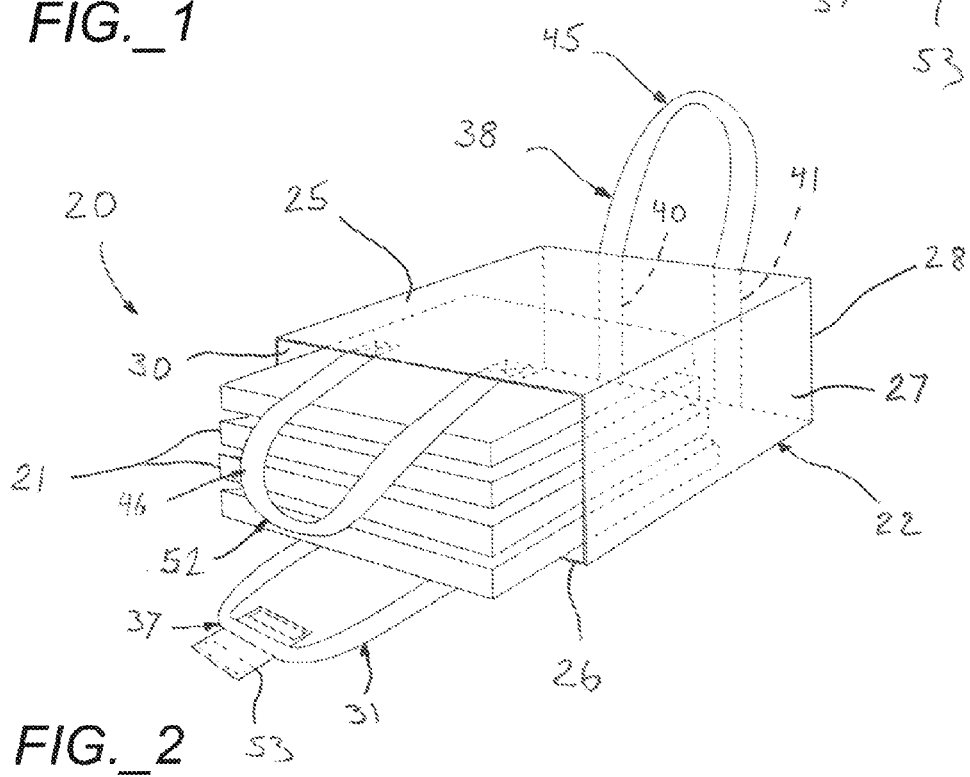
FIG._2

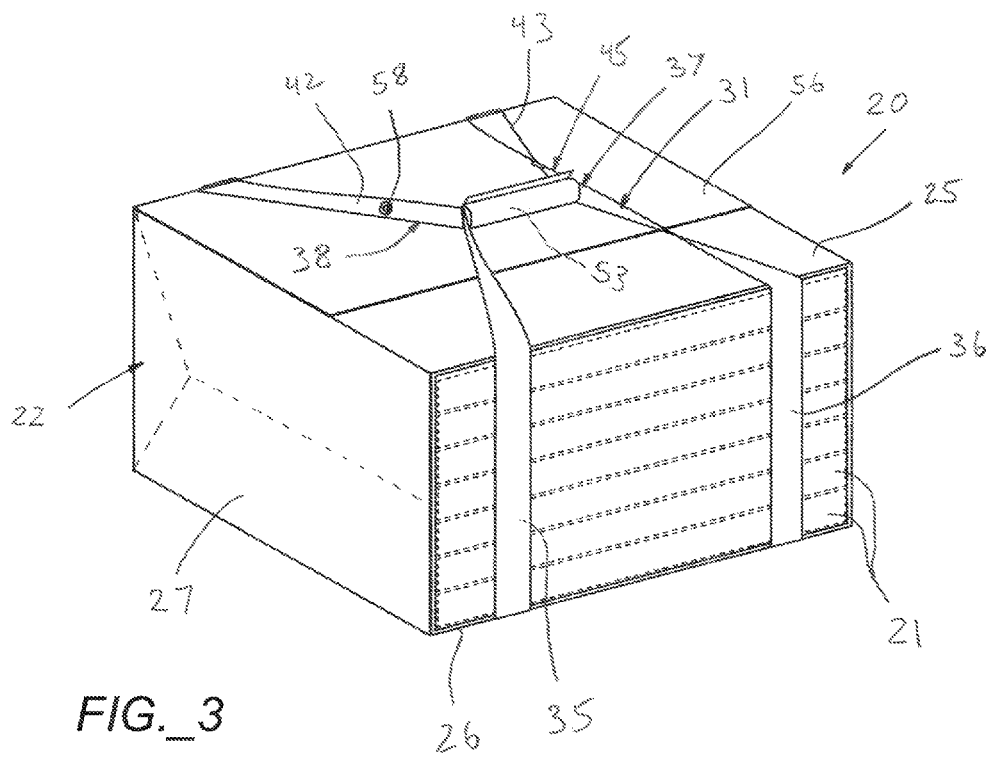
FIG._3
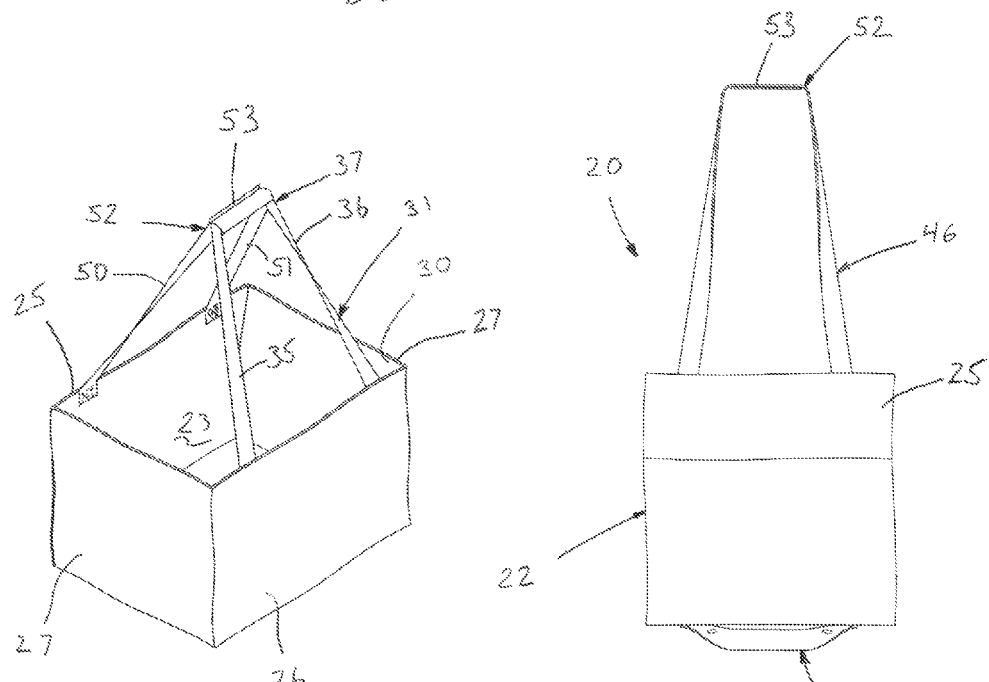
FIG._4  FIG._5

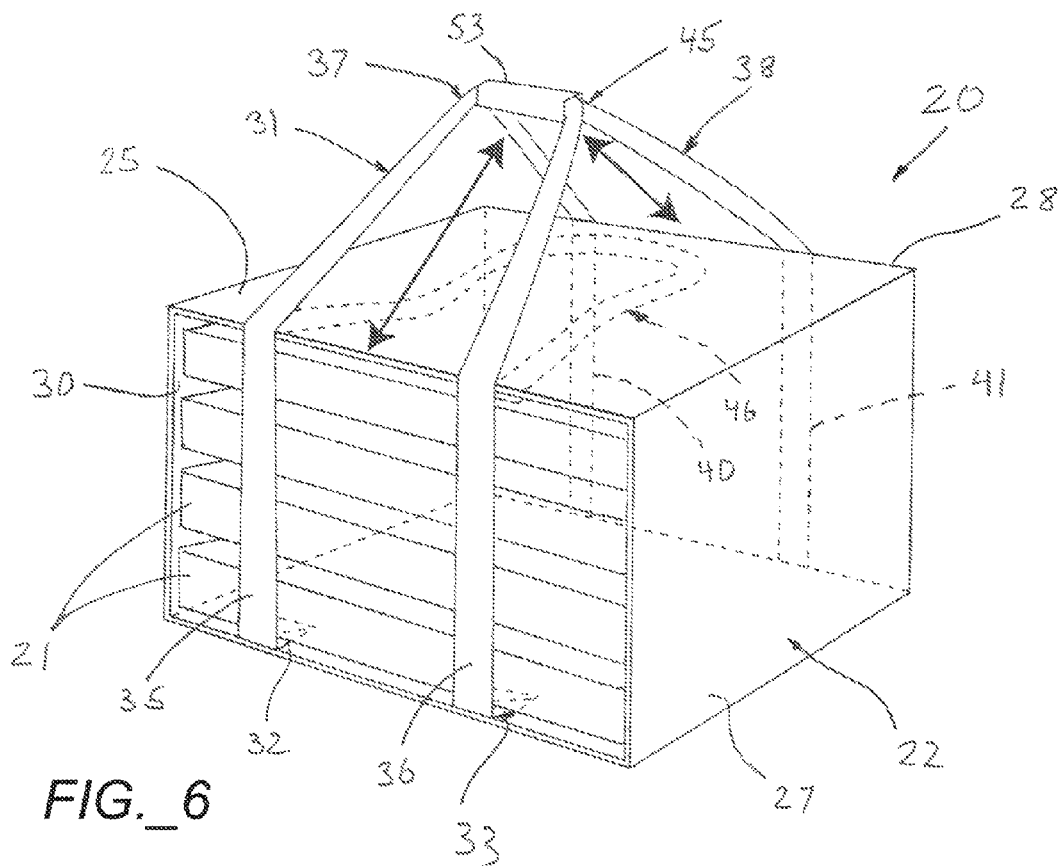
FIG._6
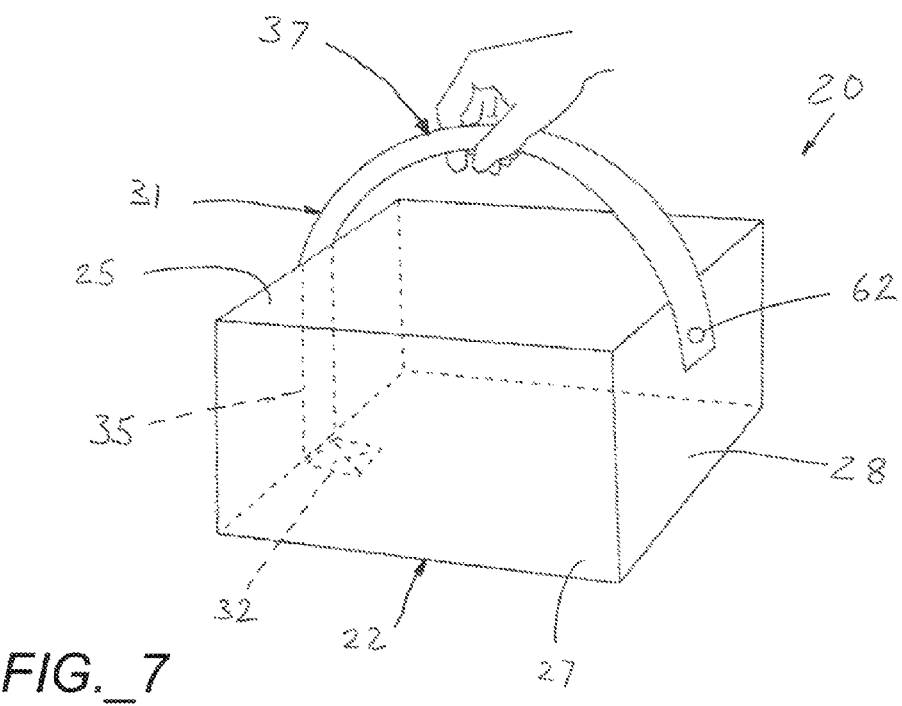
FIG._7

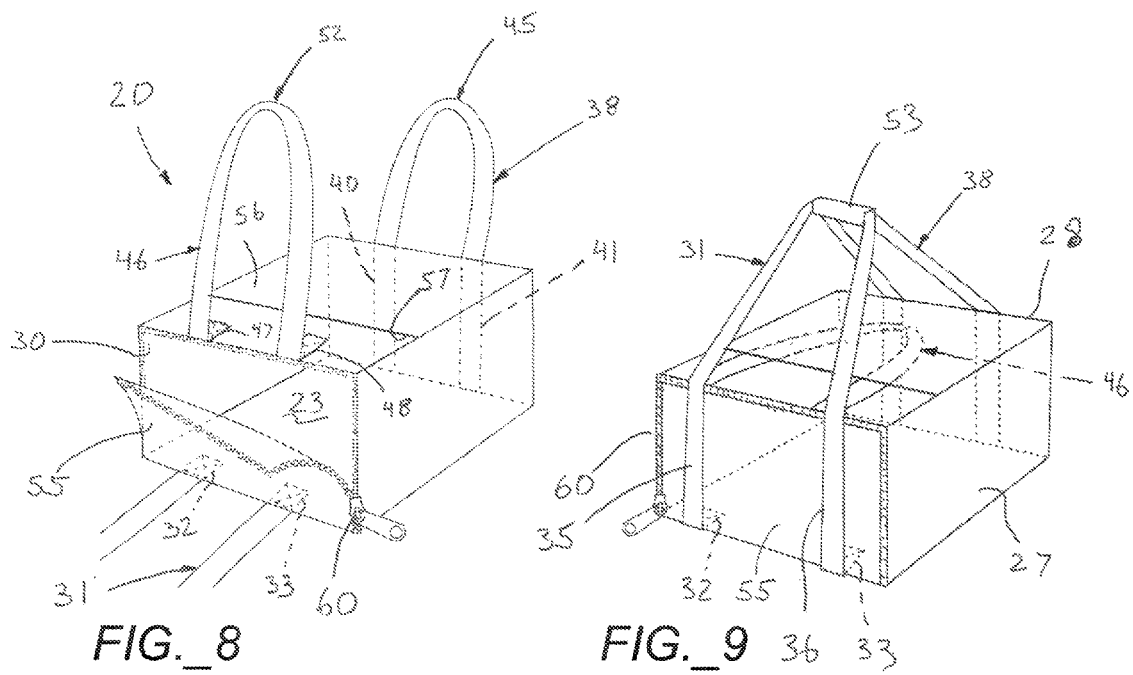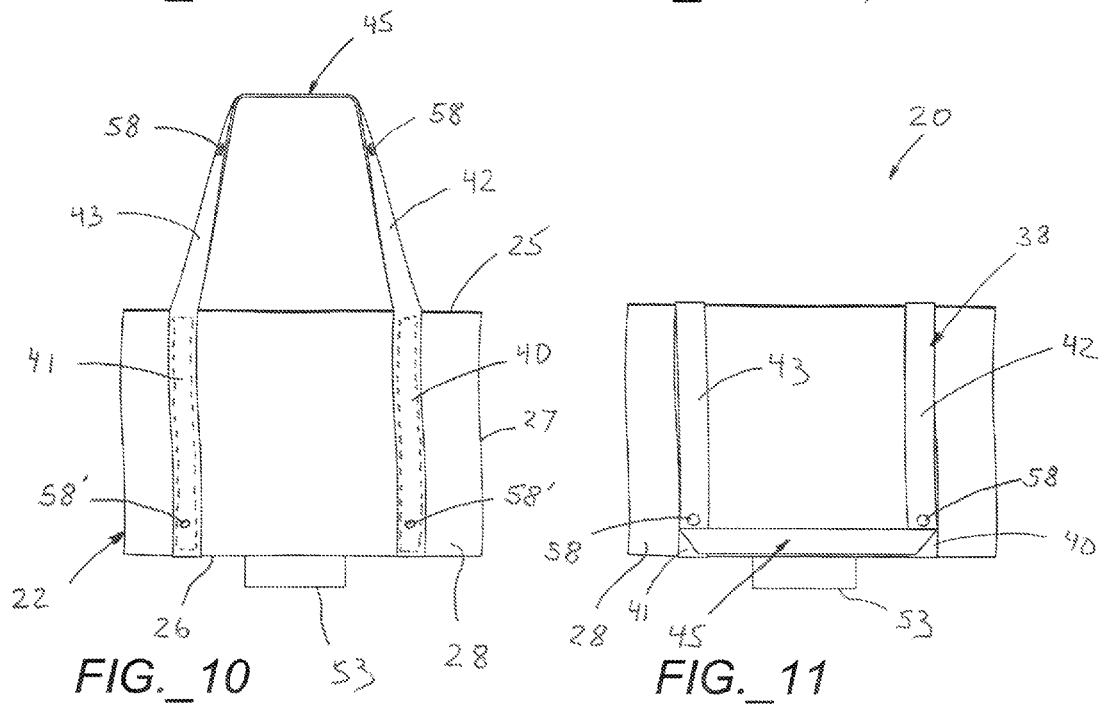

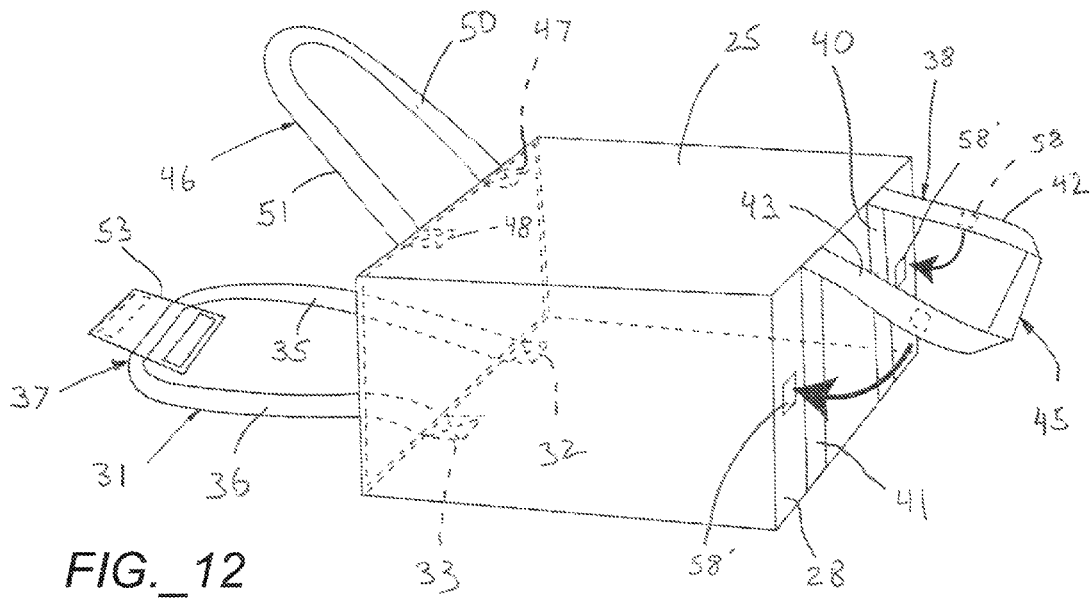
FIG._12
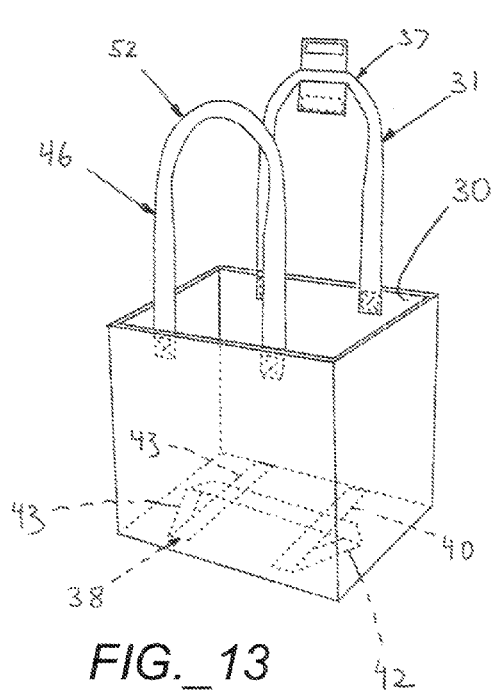
FIG._13
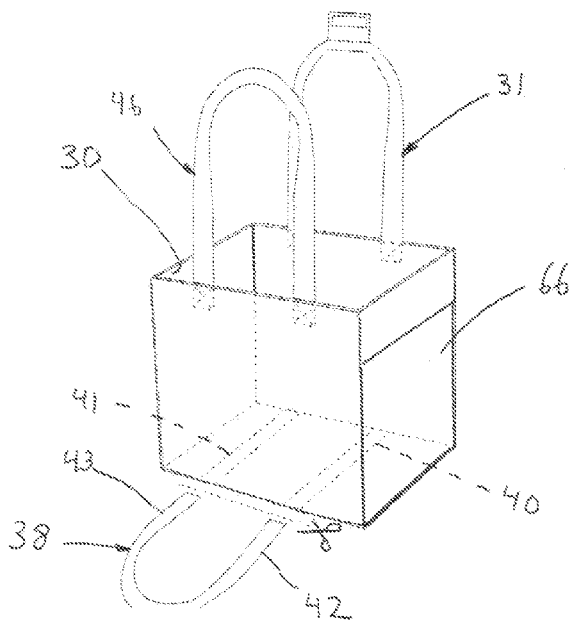
FIG._14

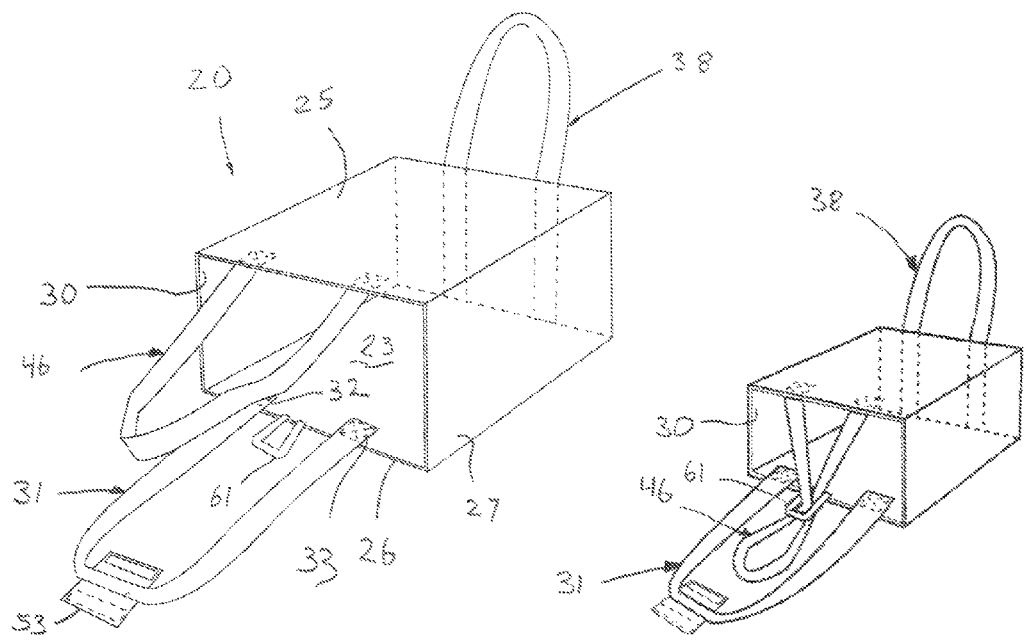
FIG._15   FIG._16
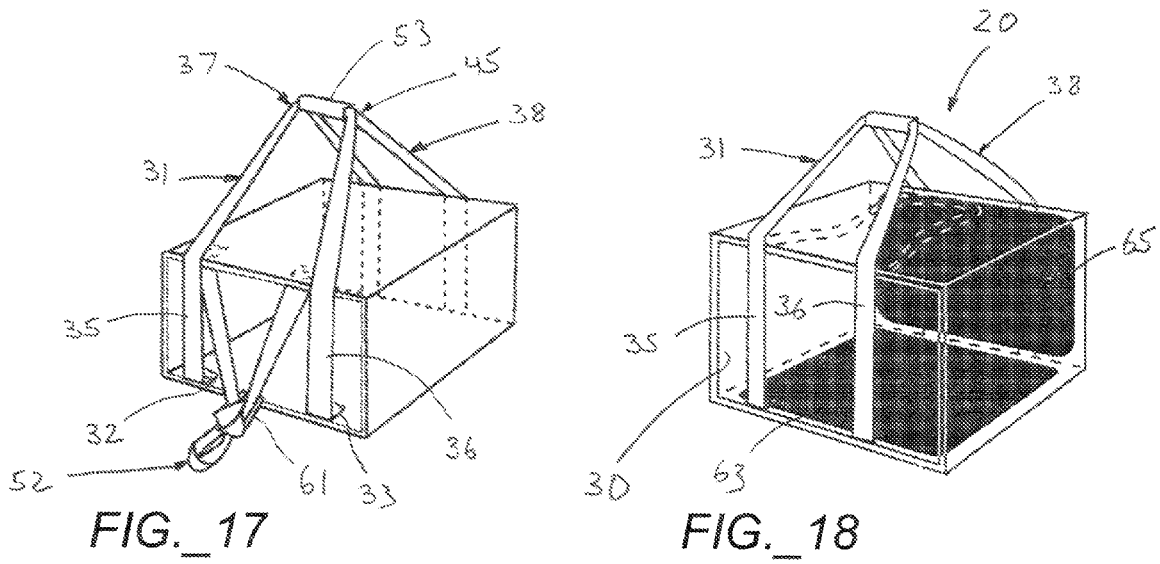
FIG._17   FIG._18

MULTI-ORIENTATION, REUSABLE CARRIER ASSEMBLY

RELATED APPLICATIONS

This application claims priority under 35 U.S.C. §119(e) from U.S. Provisional Patent Application No. 61/728,551, filed Nov. 20, 2012, entitled "REUSABLE PIZZA CONTAINER REUSABLE CARRIER ASSEMBLY", naming Tan as inventor, and which is incorporated by reference in its entirety.

FIELD OF THE INVENTION

The present invention relates to reusable bags with handles, and more particularly, relates to multi-orientation reusable container carriers with handle straps.

BACKGROUND OF THE INVENTION

Bags for enclosing stacked boxes from a first location to a second location by professional delivery personnel, such as those for transporting cardboard pizza cartons, are known in the art. These bags typically accommodate one or more boxes to be delivered to a delivery site at a remote location. For warm food items in particular, these bags are typically insulated to keep the food products warm while enroute from where they are prepared to the delivery site.

For the end customers, however, the bags distributed are typically conventional paper or plastic bags. To retain the stacked cartons in an upright position (against such as pizza or cake pastry cartons), these bags are generally horizontally reoriented on their sides, and the stacked cartons are inserted through their now side opening into the bag.

The problem associated with these conventional bags, however, is that they are not designed for handle carrying in this horizontal orientation. Accordingly, both hands are typically required to carry these bags in this orientation. Moreover, if one carrying the boxed items is careless, one or more of the boxes or items might fall out through the side opening.

Accordingly, it is desirable to provide an improved, economical carrier assembly that is reusable and can be handle carried and operated in multiple orientations.

SUMMARY OF THE INVENTION

The present invention provides a multi-orientation, reusable carrier assembly for containing retail containers therein. The reusable carrier assembly includes a carrier base having a receiving cavity defined by a first wall, an opposite second wall, and a plurality of surrounding side walls extending between the first wall and the second wall. One of the plurality of surrounding side walls includes a support wall oriented generally opposite a receiving opening into the receiving cavity thereof when the carrier base is oriented in a horizontal orientation. The carrier assembly further includes a retaining strap member having a first mount portion mounted to the second wall at a location thereof proximate to the receiving opening. The retaining strap member includes a retaining loop handle associated with the support wall for releasable retainment thereof in a first handle gripping position, centrally above the first wall, for carrying of the carrier base in the horizontal orientation. A retaining portion of the retaining strap member is positioned between the retaining loop handle and the first mount portion. This portion extends generally vertically across the receiving opening, when the retaining loop handle is in the first handle gripping position and the carrier base is in the horizontal orientation, in a manner such that the at least one retail container contained within the cavity is substantially prevented from falling out through the opening.

The retaining strap member, thus, functions as both a carrying handle, providing a means to carry and handle the carrier assembly, as well as providing a securing strap to support and retain to secure and support any larger retail containers therein in an upright, horizontal manner. That is, when the carrier base is being carried and supported by at least the retaining loop handle, in the horizontal orientation, the retaining portion of the retaining strap member is pulled taunt vertically across the receiving opening. Hence, a sufficiently wide object, such as a pizza carton or stack of pizza cartons, will be retained within the receiving cavity, and prevented from falling out through the receiving opening.

In one specific embodiment, the retaining strap member includes a pair of mount portions mounted to the second wall at a spaced locations thereof proximate to the receiving opening. A pair of retaining portions of the retaining strap member extend from each respective mount portion and terminate at the retaining loop handle. The carrier assembly further includes a second strap member having a pair of respective mount portions mounted to the support wall at a spaced locations thereof, and a pair of side portions extending from each respective mount portion and terminating at a second loop handle. The pair of retaining portions of the retaining strap member and the pair of respective side portions of the second strap member are respectively sufficiently sized and dimensioned to enable single handed, simultaneous gripping of the retaining loop handle and the second loop handle at the first handle gripping position, orienting the carrier base in the horizontal orientation.

In another configuration, a third strap member is provided also having a pair of respective mount portions mounted to the first wall at a spaced locations thereof proximate to the receiving opening. A pair of respective side portions are included, extending from each respective mount portion and terminating at a third loop handle. In accordance with this aspect of the present invention, the pair of respective side portions of the second strap member and the pair of respective side portions of the third strap member are respectively sufficiently sized and dimensioned to enable single handed, simultaneous gripping of the second loop handle and the third loop handle at a second handle gripping position. This gripping position reorients the carrier base to an upright vertical orientation where the receiving opening is facing generally upward and the support wall is facing generally downward. At the same time, this second handle gripping position is repositioned above the receiving opening in order to carry the reusable carrier assembly.

Another embodiment includes a handle wrap member mounted to at least one of the retaining loop handle, the second loop handle and the third loop handle. This handle wrap enables either the retaining loop handle and the second loop handle to be releaseably coupled to one another, or the retaining loop handle and the third loop handle to be releaseably coupled to one another.

In still another embodiment, the respective mount portions of the retaining strap member are mounted to an interior facing surface of the second wall, and the respective mount portions of the third strap member are mounted to an interior facing surface of the first wall.

Another embodiment provides that the respective mount portions of the second strap member are mounted to an exterior surface of the support wall. Moreover, in specific embodiments, the respective mount portions include support straps that extend generally between the first wall and the second wall.

In yet another configuration, the second strap member includes one or more fastening devices to removeably fasten portions of the side portions on to one of the support wall and the respective mount portions thereof, during period of non-use. These fastening devices are selected from the group consisting of buttons, snaps, and hook and loop material.

Still another embodiments provides a carrier assembly that includes a closing flap extending outwardly from one of the first wall and the second wall at the receiving opening. The closing flap is sized and dimensioned to selectively extend over the opening in a manner closing the receiving opening.

In another embodiment, the retaining strap member is elongated and includes a proximal end containing the first mount portion and a distal end configured to removably mount to the support wall such that the retaining loop handle is oriented in the first handle gripping position and the carrier base is oriented in the horizontal orientation.

In another aspect of the present invention, a reusable carrier assembly is provided for containing a plurality of conventional polygon prism-shaped containers, aligned and stacked atop one another. The carrier assembly includes a polygon prism-shaped carrier base having a receiving cavity defined by a polygon-shaped top wall, an opposite, similarly shaped polygon-shaped bottom wall, and a plurality of substantially planar surrounding side walls extending between the top wall and the bottom wall. One of the plurality of surrounding side walls includes a support wall oriented generally opposite a receiving opening, sidewardly facing, into the receiving cavity thereof when the carrier base is oriented in a horizontal orientation. The carrier assembly includes a retaining strap member having a pair of respective mount portions mounted to the bottom wall at a spaced locations thereof proximate to the receiving opening. A pair of retaining portions extends from each respective mount portion and terminates at a retaining loop handle. The carrier assembly further includes a second strap member having a pair of respective mount portions mounted to the support wall at a spaced locations thereof, and a pair of side portions that extend from each respective mount portion and terminate at a second loop handle. A third strap member is provided having a pair of respective mount portions mounted to the top wall at a spaced locations thereof proximate to the receiving opening, and a pair of respective side portions extending from each respective mount portion and terminating at a third loop handle. The pair of retaining portions of the retaining strap member and the pair of respective side portions of the second strap member are respectively sufficiently sized and dimensioned to enable single handed, simultaneous gripping of the retaining loop handle and the second loop handle at a first handle gripping position, centrally above the top wall. This gripping position enables carrying of the carrier base in the horizontal orientation in a manner preventing at the least one polygon-sided container contained within the from falling out therethrough. In contrast, the pair of respective side portions of the second strap member and the pair of respective side portions of the third strap member are respectively sufficiently sized and dimensioned to enable single handed, simultaneous gripping of the second loop handle and the third loop handle at a second handle gripping position, above the receiving opening. This gripping position enables carrying of the reusable carrier assembly in an upright vertical orientation where the receiving opening is facing generally upward and the support wall is facing generally downward.

In one specific embodiment, the top wall includes an external pocket. In another configuration, the polygon-shaped top and bottom walls are quadrilateral-shaped.

Still another embodiment provides a carrier base that includes an insulative material. Yet another embodiment further includes a closing flap extending outwardly from one of the top wall and the bottom wall at the receiving opening. The closing flap is sized and dimensioned to selectively extend over the opening in a manner closing the opening.

BRIEF DESCRIPTION OF THE DRAWINGS

The assembly of the present invention has other objects and features of advantage which will be more readily apparent from the following description of the best mode of carrying out the invention and the appended claims, when taken in conjunction with the accompanying drawings, in which:

FIG. 1 is a top perspective view of a multi-orientation, reusable carrier assembly constructed in accordance with the present invention, in a horizontal orientation.

FIG. 2 is a top perspective view of the carrier assembly of FIG. 1, illustrating the insertions of retail containers.

FIG. 3 is a top perspective view of the carrier assembly of FIG. 1, showing the strap members in a first handle gripping position.

FIG. 4 is a top perspective view of the carrier assembly of FIG. 1 in an upright vertical orientation.

FIG. 5 is a front elevation view of the carrier assembly of FIG. 4.

FIG. 6 is another top perspective view of the carrier assembly of FIG. 1, showing the strap members, in a first handle gripping position.

FIG. 7 is a top perspective view of an alternative embodiment single strap multi-orientation, reusable carrier assembly, in a horizontal orientation.

FIG. 8 is a top perspective view of another alternative embodiment multi-orientation, reusable carrier assembly, having a closing flap and oriented in a horizontal orientation.

FIG. 9 is a top perspective view of the multi-orientation, reusable carrier assembly of FIG. 8 with the closing flap in a closed condition.

FIG. 10 is a bottom plan view the reusable carrier assembly of FIG. 1, showing a fastening device for the second strap member, oriented in a horizontal orientation.

FIG. 11 is a bottom plan view the reusable carrier assembly of FIG. 10 with the fastening device for the second strap member engaged.

FIG. 12 is a side perspective view bottom plan view the reusable carrier assembly of FIG. 1, showing an alternative embodiment fastening device for the second strap member, oriented in a horizontal orientation.

FIG. 13 is a top perspective view of the carrier assembly of FIG. 12, illustrating the carrier assembly in an upright vertical orientation, and showing the fastening device for the second strap member engaged.

FIG. 14 is a top perspective view of the carrier assembly of FIG. 1 in an upright vertical orientation, showing removal of the second strap member.

FIGS. 15-17 is a sequence showing an alternative use of the third strap member to facilitate retainment of retail containers in the carrier assembly.

FIG. 18 is a top perspective view of the carrier assembly of FIG. 1, showing the placement of wall support inserts.

DETAILED DESCRIPTION OF THE INVENTION

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Turning now to FIGS. 1-7, a multi-orientation, reusable carrier assembly, generally designated 20, is provided for containing retail containers 21 therein. The reusable carrier assembly 20 includes a carrier base 22 having a receiving cavity 23 defined by a first wall 25, an opposite second wall 26, and a plurality of surrounding walls 27 extending between the first wall and the second wall. One of the plurality of surrounding walls 27 includes a support wall 28 oriented generally opposite a receiving opening 30 into the receiving cavity thereof when the carrier base is oriented in a horizontal orientation (e.g., generally used to horizontally carrying stacked pizza cartons, etc., as shown in FIGS. 1-3 and 6-8). The carrier assembly further includes a retaining strap member 31 having a pair of mount portions 32, 33 mounted to the second wall 26 at a spaced locations thereof proximate to the receiving opening 30. The retaining strap member 31 further includes a pair of retaining portions 35, 36 extending from each respective mount portion 32, 33 and terminating at a retaining loop handle 37. A second strap member 38 is included having a pair of respective mount portions 40, 41 mounted to the support wall 28 at a spaced locations thereof, and a pair of corresponding side portions 42, 43 extending from each respective mount portion and terminating at a second loop handle 45.

In accordance with the present invention, the pair of respective retaining portions 35, 36 of the retaining strap member 31 and the pair of respective side portions 42, 43 of the second strap member 38 are respectively sufficiently sized and dimensioned to enable single handed, simultaneous gripping of the retaining loop handle 37 and the second loop handle 45 at a first handle gripping position (FIGS. 3, 6 and 7), centrally above the first wall 25 and orienting the carrier base 22 in the horizontal orientation.

Accordingly, the retaining strap member 31, when positioned at the first handle gripping position performs three main functions. The retaining loop handle provides a means to carry and handle the carrier assembly. The second function is that in the first handle gripping position, the retaining strap member 31, as well as the second strap member 38, facilitates maintenance of the carrier base 22 in the horizontal orientation while being carried, thereby supporting of the retail containers 21 therein in an upright, horizontal manner, in the receiving cavity 23. Lastly, as best shown in FIGS. 3, 6, 7, 9 and 17, when the retaining loop handle 37 is positioned in the first handle gripping position, the spaced-apart retaining portions 35, 36 thereof are oriented generally vertically, and pulled taunt across the receiving opening 30. Hence, a sufficiently wide object, such as a single or stack of pizza cartons, will be retained within the receiving cavity 23, and prevented from falling out through the receiving opening 30, via the taunt retaining portions 35, 36 of the retaining strap member 31.

The reusable carrier assembly 20 still further includes a third strap member 46 having a pair of respective mount portions 47, 48 mounted to the first wall 25 at a spaced locations thereof proximate to the receiving opening 30. A pair of respective side portions 50, 51 extend from each respective mount portion 47, 48, and terminate at a third loop handle 52. As best shown in FIGS. 4 and 5, the pair of respective side portions 42, 43 of the second strap member 38 and the pair of respective side portions 50, 51 of the third strap member 46 are respectively sufficiently sized and dimensioned to enable single handed, simultaneous gripping of the second loop handle 45 and the third loop handle 52 at a second handle gripping position. In this manner, the reusable carrier assembly 20 reorients the carrier base in an upright vertical orientation (FIGS. 4, 13 and 14) where the receiving opening 30 is facing generally upward and the support wall 28 is facing generally downward, and the second handle gripping position is oriented above the receiving opening 30.

In accordance with the present invention, the multi-orientation, reusable carrier assembly 20 provides the option of simultaneously gripping and/or using the second loop handle 45 and the retaining loop handle 37 in a manner orienting the carrier base 22 in the generally horizontal position (i.e., the horizontal orientation, FIGS. 3, 6, 7 and 9) in order to carry, support and secure retail containers therein in a horizontal orientation, or simultaneously gripping and/or using the retaining loop handle 37 and the third loop handle 52 in a manner orienting the carrier base 22 in the generally vertical upright position (i.e., the vertical orientation, FIGS. 4, 5, 13 and 14).

Referring back to FIGS. 2 and 3, the reusable carrier assembly 20 is shown and illustrated carrying multiple retail containers 21, such as stacked pizza containers, in a secure manner. The reusable carrier assembly preferably includes a polygon prism-shaped flexible carrier base 22, and more preferably provided by a rectangular prism or cube shaped carrier base. In the horizontal orientation, as best viewed in FIG. 2, the receiving opening 30 into the receiving cavity 23 is oriented at a side thereof to enable simple, horizontal insertion of the retail containers 21 in one or a stacked configuration. This significantly eases insertion of stacked food items, such as stacked pizza boxes or pie boxes, for instance. The carrier base 22 is further defined by a substantially planar square or rectangular first wall 25 and opposed, similarly shaped second wall 26 that, in the horizontal orientation, function as a containing top wall and a vertically supportive bottom wall, respectively, aiding the containment and vertical support of the stacked containers 21, therein, in an upright horizontal manner.

While the carrier base 22 is illustrated primarily as rectangular prism-shaped, it will be appreciated that the carrier base 22 could be substantially cylindrical-shaped, formed to accommodate a more circular-shaped pizza container, for instance. Furthermore, the carrier base can be sized to accommodate conventional small, medium, large and/or extra large sizes, as well as accommodating 3-5 or more containers in a stacked condition. It will further be appreciated that while the present invention is described for the most part with reference to containing pizza containers, the present invention could be applied to carry nearly any container.

As best shown in FIGS. 1 and 4, the surrounding walls 27, 28 (when oriented in the horizontal orientation), and the first and opposed second walls 25, 26, collectively define the receiving cavity 23. All these walls of the reusable carrier assembly 20 are preferably relatively thin and flexible, and are composed of a recyclable material such as those materials used in nylon, plastic or paper bags. It will be appreciated, however, that the material composition may also be insulated, or include insulated material (FIGS. 8 and 9), similar to that of convention thermal carrying bags. In one configuration, the carrier base 22 can include pre-folds, as shown in FIGS. 1 and 3, so as to permit collapsing to a flattened, stored condition during periods of non-use (e.g., like conventional paper bags).

In accordance with the present invention, as mentioned above, the retaining strap member 31 dually functions as both a handle member, in the first gripping position, to facilitate carrying of the container reusable carrier assembly 20 in the horizontal orientation (FIGS. 3, 6 and 7), as well as providing a means for retaining and securing retained containers 21 in the receiving cavity 23. This is performed by virtue of the respective retaining portions 35, 36 of the retaining strap member extending generally vertically across the receiving opening 30 in a spacer manner. The retaining strap member 31, however, also cooperates with the third strap member 46, in the second gripping position, to orient and operate the carrier assembly in the upright vertical orientation (FIGS. 4 and 5).

When the reusable carrier assembly 20 is positioned for use in the horizontal orientation, and box containers 21 are positioned through the rectangular-shaped receiving opening 30 (in this shown embodiment) and fully into the receiving cavity 23, the retaining strap member 31 can be pulled vertically upward, repositioning the respective retaining portions 35, 36 upright and vertically traversing the receiving opening 30 in a spaced-apart manner. The length of the respective retaining portions 35, 36 of the retaining strap member 31 from their anchored respective pair of mount portions 32, 33 is sufficient to vertically span the height of the receiving opening 30, as well as enable the retaining loop handle 37 to be more centrally positioned over the top first wall 25 (FIGS. 3, 6 and 7). Thus, when the retaining strap member 31 is oriented in the first gripping position, by placing the retaining loop handle 37 centrally over the first wall 25, the pair of retaining portions 35, 36 are positioned tautly and vertically across the receiving opening 30 to retain any containers securely therein.

In general, to mount all of the respective mount portions 32, 33; 40, 41; and 50, 51 of the respective strap members 31, 38 and 46 to their respective carrier base walls 26, 28 and 25, any conventional mounting techniques can be employed such as sewing or stitching, adhesives and/or fasteners. For the most part, sewing or stitching is applied for illustration purposes.

With respect to the retaining strap member 31, the corresponding mount portions 32, 33 are oriented along the second wall 26, near the receiving opening 30, such that the respective retaining portions extend in a direction out of or away from both the receiving cavity and the receiving opening 30. This, of course, facilitates the positioning of the retaining portion vertically across the receiving opening when the carrier assembly 20 is oriented in the horizontal orientation.

Similarly, as shown in FIGS. 4 and 13, the respective pair of mount portions 47, 48 of the third strap member 46 are mounted to the first wall 25, also preferably near the receiving opening 30, as well as facing the same direction as that of the mount portions 40, 41 of the second strap member 38. The respective third loop handle 52 is also configured to be oriented above the receiving opening 30, such that the respective retaining and third loop handles 37, 52 may be simultaneously gripped in the second gripping position.

In the embodiments shown in FIGS. 1-6, the respective pair of mount portions 32, 33 and the corresponding retaining portions 35, 36 of the retaining strap member 31 are spaced apart in a manner both forming the corresponding retaining loop handle 37, but are also sufficiently spaced to allow the spacing of the retaining portions 35, 36 generally vertically across the receiving opening 30. It will be appreciated that, in general, the lateral spacing between mount portions 32 and 33 is in the range of about ⅓ to about ¾ the width of the receiving opening 30, and more preferably about ½ the width of the receiving opening 30, when in the horizontal orientation. Moreover, it will be appreciated that the lateral spacing between the mount portions 40, 41, and 47, 48 of the second and third strap members 38, 46 will also be similarly spaced.

Briefly, as will be described below for the single retaining strap embodiment of FIG. 7, the mounting portion 32 will be more centrally mounted relative the width of the receiving opening 30.

Preferably, the respective pair of mount portions 32, 33 and 47, 48 for both the retaining strap member 31 and the third strap member 46 are mounted to interior facing surfaces of their respective first wall 25 and second wall 26, using similar sewn, adhered or fastened techniques. It will be appreciated, however, that the respective pair of mount portions of the retaining strap member and the third strap member could be mounted to the exterior surfaces of the first and second walls, as will be further detailed in the embodiments shown in FIGS. 8 and 9.

Turning now to mount of the second strap member 38 to the support wall 28, as mentioned, the respective pair of mount portions 40, 41 are affixed to an exterior face of the support wall 28. As shown in FIGS. 2, 10 and 12, orientation of the mounts are such that the corresponding side portions 42, 43 are positioned to direct second loop handle 45 above the first wall 25, toward the first gripping position, when the carrier assembly is oriented in the horizontal orientation.

For a more secured mount, the respective mount portions 40, 41 of the second strap member 38 can extend a longer portion of, or the entire vertical length, of the support wall thereof between the first wall 25 and the second wall 26. These elongated mount portion s provide additional side support to rear support wall 28, and to containers 21 received in the reusable carrier assembly 20, when in the horizontal orientation. However, when the carrier base 22 is oriented in the upright vertical position, the additional bottom support is especially useful To provide the most stout vertical support, of course, the respective mount portions 40, 41 can be sewn, adhered or fastened to the support wall 28 along their entire lengths.

To assure that the retaining strap member 31 and the second strap member 38, in the first gripping position, orient the carrier base 22 in a substantially horizontal level, in the horizontal orientation (FIGS. 3, 6 and 7), the retaining and second loop handles 37, 45 must be properly positioned relative to one another. Accordingly, the lengths retaining portions 35, 36 of the retaining strap member 31 must be adjusted to vertically span the gap of the receiving opening 30, as well as provide sufficient additional length to match that of the side portions 42, 43 of the second strap member 38. Collectively, the additional length of the retaining portions 35, 36 will enable simultaneous gripping of the second loop handle 45 with the retaining loop handle 37, in the first gripping condition.

Moreover, the lengths side portions 50, 51 of the third strap member 46 are also as substantially similar to the lengths of the retaining portions 35, 36 of the retaining strap member 31. Such length similarity functions to position the corresponding retaining loop handle 37 and the third loop handle 52, in the second gripping position, generally centrally above the receiving opening, and reorients the carrier base 22 in the upright vertical orientation (FIGS. 4, 13 and 14).

To facilitate maintenance and retainment of the retaining and second loop handles 37, 45, in the first gripping position, (FIGS. 3 and 6), and the retaining and third loop handles 37, 52, in the second gripping position, (FIG. 4), a closure handle wrap 53 may be provided. Such a handle wrap can be applied to removably coupled the corresponding loop handles together to further facilitate carrying of the carrier base in either the horizontal orientation or the vertical orientation. Using conventional techniques, such as those applied with most carrying bags and luggage, any of the loop handles may include the closure handle wrap 53 which is formed and dimensioned to extend around both strap members at the respective loop handles for coupling there between.

Placement and affixation of the closure handle wrap 53 on the second loop handle 45, however, is most efficient since the retaining strap member 31 is commonly utilized in both the first gripping position and the second gripping position. The closure handle wrap 53 may be rectangular shaped, and may be comprised of a material similar to that of the walls of the carrier base and/or that of the strap members. To fasten the ends of the closure handle wrap around the corresponding loop handles, the hook and loop fasteners, such as VEL-CRO®, or snap fasteners may be included.

As mentioned above, the respective pair of mount portions 47, 48 of the third strap member 46 may be mounted on the interior facing surface of the first wall 25. This mounting placement more easily allows the third strap member 46 to be folded back into the receiving cavity 23, tucking the strap member away during non-use, such as when the reusable carrier assembly is oriented in the horizontal orientation where only the first and retaining strap members are being used (FIGS. 6 and 18).

In another configuration, the respective pair of mount portions 47, 48 of the third strap member 46 may be mounted on the exterior facing surface of the first wall 25 (FIGS. 8 and 9). This external mounting arrangement may be utilized when the carrier base 22 includes a closing flap 55, such as that shown in the embodiment of FIG. 8. To tuck away the exterior mounted third strap member 46 when not in use, in this configuration, an exterior pocket 56 (FIGS. 1 and 9) may be provided having a pocket opening 57 upon which the third loop handle 52 may be inserted.

This exterior pocket 56, which of course may serve other carrying functions as well, could be any useful size. In the one specific embodiment shown, the pocket 56 is formed by peripherally affixing a sheet material over the first wall 25 of carrier base 22 by stitching or other conventional means. Again, when the reusable carrier assembly 20 is oriented in the horizontal orientation where only the retaining strap member and the second strap member are being used (FIG. 9), the unused third strap member 46 can be folded back into the exterior pocket 25.

In still another specific embodiment, when the carrier base 22 is oriented in the upright, vertical orientation, the second strap member 38 can be similarly stowed away when not in use, via removable fasteners 58, 58'. FIGS. 10-13 best illustrate the second strap member 38 being folded over and removeably fastened onto itself at the support wall 28, which functions as a bottom support wall when in the vertical orientation. This removably affixes the second strap member 38 relatively flush to the support wall 28 during non-use or when the reusable carrier assembly is being used as a grocery bag (FIGS. 11 and 13). This enables removable affixation of the strap member to the support wall in a manner that significantly reduces potential snagging.

In one example, corresponding snap button components 58, 58' and 58', 58' can be located at aligned portions along the respective side portions 42, 43, and along the corresponding pair of mount portions 40, 41 of the second strap member 38. To stow away the second loop handle, the bight portion is folded back onto itself, aligning the corresponding snap button components 58, 58 and 58', 58'. Other forms of conventional fasteners can be utilized as well, such providing a set of aligned hook and loop patches can be affixed to the exterior surface of the support wall 28, and/or the second strap member 38, such as that shown in FIGS. 12 and 13. Other alternative include the use of adhesives, hooks, latches, etc., or, as best shown in FIG. 14, simply severing the second strap member 38 to permanently remove the strap should it not be needed anymore.

In still another arrangement, as mentioned above, at the peripheral edge of either the first wall 25, the second wall 26, or even the surrounding walls 27 that define the receiving opening 30, a closing flap 55 may extend outwardly therefrom. This closing flap is sized and dimensioned to extend over, and to close, the receiving opening 30. This embodiment is particularly suitable when, for instance, a carrier bag is thermally insulated for either retaining heat or coolness, such as that shown in FIGS. 8 and 9.

In this arrangement, a zipper device 60 or the like can be included that extends peripherally around the opening edge, as well as peripherally around the closing flap 55 to securely close the opening. Moreover, in this configuration, as mentioned above, the mount portions 32, 33 and 47, 48 of the corresponding retaining strap member 31 and the third strap member 46 are affixed to the exterior surface of the walls to permit unencumbered closure of the flap.

In still another specific embodiment, as shown in FIGS. 15-17, another technique is provided for using the retaining strap member 31 to retain retail containers in the receiving cavity 23, and to prevent the same from falling out through opening 30. In this configuration, a center engaging loop 61 may be mounted to the second wall 26 between the pair of mount portions 32, 33 of the retaining strap member 31. This engaging loop is formed to receive the third strap member 46 as it extends vertically across the receiving opening 30 when the pizza containers are contained therein in a manner similar to the retaining strap member 31 in the horizontal orientation. Accordingly, once the third loop handle 52 of the third strap member 46 is positioned through the engaging loop 61, and knotted thereto, an additional means of retaining support is provided to retain the pizza containers 21 within the reusable carrier assembly.

Referring now to FIG. 7, a single strap embodiment is illustrated that includes a single retaining strap member 31. One distal end of the retaining strap member 31 affixed to the second wall 26, via mount portion 32, in the same manner as described above. The length of the central strap member 31 is sized such an opposite distal end can be removably mounted (via hook and loop fasteners, snap fasteners (62) or the like) to the rear side support wall 28, and that the strap member also functions as a retaining loop handle 37, while simultaneously securing the containers 21 therein in the horizontal orientation.

In another specific embodiment, support inserts 63, 65, (FIG. 18) can be included to provide additional carrying support, be it in the container carrying position or the upright grocery carrying position. Additionally, a side pocket 66 can be included (FIG. 14) that provides storage of condiments or any other accessories.

While the present invention has been described in connection with the preferred form of practicing it and modifications thereto, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

What is claimed is:

1. A multi-orientation, reusable carrier assembly for containing retail containers comprising:
   a carrier base having a receiving cavity defined by a first wall, an opposite second wall, and a plurality of surrounding side walls extending between the first wall and the second wall, one of the plurality of surrounding side walls includes a support wall oriented generally opposite a receiving opening, having a height dimension, into said receiving cavity thereof when said carrier base is oriented in a horizontal orientation;
   a retaining strap member having a pair of respective mount portions mounted to the second wall at spaced locations thereof proximate to the receiving opening, and a pair of retaining portions extending from each respective mount portion and terminating at a retaining loop handle; and
   a second strap member having a pair of respective mount portions mounted to the support wall at spaced locations thereof, and a pair of side portions extending from each respective mount portion and terminating at a second loop handle;
   wherein each retaining portion of said retaining strap member being of a sufficient length to span the height dimension of said receiving opening and to position the retaining loop handle generally centrally above the first wall, on the opposite side of said second wall, to a first gripping position, and such that said retaining portions extend generally vertically across the receiving opening in a manner preventing at least one retail container contained within the cavity from falling out therethrough when said carrier base is oriented in the horizontal orientation; and
   wherein said pair of respective side portions of the second strap member are respectively sufficiently sized and dimensioned to position the second loop handle generally centrally above the first wall, adjacent said retaining loop handle, to enable single handed, simultaneous gripping of the retaining loop handle and the second loop handle at the first handle gripping position, orienting the carrier base in the horizontal orientation.

2. The reusable carrier assembly according to claim 1, further including:
   a third strap member having a pair of respective mount portions mounted to the first wall at a spaced locations thereof proximate to the receiving opening, and a pair of respective side portions extending from each respective mount portion and terminating at a third loop handle,
   wherein the pair of respective side portions of the second strap member and the pair of respective side portions of the third strap member are respectively sufficiently sized and dimensioned to enable single handed, simultaneous gripping of the second loop handle and the third loop handle at a second handle gripping position, above the receiving opening, to carry the reusable carrier assembly and orienting the carrier base in an upright vertical orientation where the receiving opening is facing generally upward and the support wall is facing generally downward.

3. The reusable carrier assembly according to claim 2, further including:
   a handle wrap member mounted to at least one of the retaining loop handle, the second loop handle and the third loop handle.

4. The reusable carrier assembly according to claim 3, wherein
   the handle wrap member is mounted to the retaining loop handle.

5. The reusable carrier assembly according to claim 2, wherein
   the respective mount portions of the retaining strap member are mounted to an interior facing surface of the second wall, and the respective mount portions of the third strap member are mounted to an interior facing surface of the first wall.

6. The reusable carrier assembly according to claim 1, wherein
   the respective mount portions of the second strap member are mounted to an exterior surface of said support wall, and further include support straps extending generally between the first wall and the second wall.

7. The reusable carrier assembly according to claim 6, wherein
   the second strap member includes one or more fastening devices to removeably fasten portions of the pair of side portions on to one of the support wall and the respective mount portions thereof, during period of non-use.

8. The reusable carrier assembly according to claim 7, wherein
   the fastening devices are selected from the group consisting of buttons, snaps, and hook and loop material.

9. The reusable carrier assembly according to claim 1, wherein
   the carrier base includes an insulative material.

10. The reusable carrier assembly according to claim 1, further including
    a closing flap extending outwardly from one of the first wall and the second wall at the opening, the closing flap being sized and dimensioned to selectively extend over the opening in a manner closing the opening.

11. The reusable carrier assembly according to claim 1, wherein
    said retaining strap member is elongated having a proximal end containing the first mount portion and a distal end configured to removably mount to said support wall such that said retaining loop handle is oriented in the first handle gripping position and said carrier base is oriented in said horizontal orientation.

12. A reusable carrier assembly for containing a plurality of conventional polygon prism-shaped containers, aligned and stacked atop one another, the carrier assembly comprising:
    a polygon prism-shaped carrier base having a receiving cavity defined by a polygon-shaped top wall, an opposite, similarly shaped polygon-shaped bottom wall, and a plurality of substantially planar surrounding side walls extending between the top wall and the bottom wall, one of the plurality of surrounding side walls includes a support wall oriented generally opposite a receiving opening, sidewardly facing and having a height dimension, into said receiving cavity thereof when said carrier base is oriented in a horizontal orientation;
    a retaining strap member having a pair of respective mount portions mounted to the bottom wall at spaced locations thereof proximate to the receiving opening, and a pair of retaining portions extending from each respective mount portion and terminating at a retaining loop handle;
    a second strap member having a pair of respective mount portions mounted to the support wall at a spaced locations thereof, and a pair of side portions extending from each respective mount portion and terminating at a second loop handle, and a third strap member having a pair of respective mount portions mounted to the top wall at a spaced locations thereof proximate to the receiving opening, and a pair of respective side portions extending from each respective mount portion and terminating at a third loop handle;

wherein each retaining portion of said retaining strap member being of a sufficient length to span the height dimension of said receiving opening and to position the retaining loop handle generally centrally above the top wall, on the opposite side of said bottom wall, to a first gripping position, and such that said retaining portions extend generally vertically across the receiving opening in a manner preventing at least polygon-sided container contained within the receiving cavity from falling out therethrough when said carrier base is oriented in the horizontal orientation;

wherein said pair of respective side portions of the second strap member are respectively sufficiently sized and dimensioned to position the second loop handle generally centrally above the top wall, adjacent said retaining loop handle, to enable single handed, simultaneous gripping of the retaining loop handle and the second loop handle at the first handle gripping position, orienting the carrier base in the horizontal orientation; and wherein the pair of respective side portions of the second strap member and the pair of respective side portions of the third strap member are respectively sufficiently sized and dimensioned to enable single handed, simultaneous gripping of the second loop handle and the third loop handle at a second handle gripping position, above the receiving opening, to carry the reusable carrier assembly and orienting the carrier base in an upright vertical orientation where the receiving opening is facing generally upward and the support wall is facing generally downward.

13. The reusable carrier assembly according to claim 12, wherein
the top wall includes an external pocket.

14. The reusable carrier assembly according to claim 12, further including:
a handle wrap member mounted to at least one of the retaining loop handle, the second loop handle and the third loop handle.

15. The reusable carrier assembly according to claim 12, wherein
the respective mount portions of the retaining strap member are mounted to an interior facing surface of the bottom wall, and the respective mount portions of the third strap member are mounted to an interior facing surface of the top wall.

16. The reusable carrier assembly according to claim 12, wherein
the respective mount portions of the second strap member are mounted to an exterior surface of said support wall, and further include support straps extending generally between the top wall and the bottom wall.

17. The reusable carrier assembly according to claim 16, wherein
the second strap member includes one or more fastening devices to removably fasten portions of the pair of side portions on to one of the support wall and the respective mount portions thereof, during period of non-use.

18. The reusable carrier assembly according to claim 17, wherein
the carrier base includes an insulative material, and further including a closing flap extending outwardly from one of the top wall and the bottom wall at the receiving opening, the closing flap being sized and dimensioned to selectively extend over the opening in a manner closing the opening.

19. The reusable carrier assembly according to claim 12 wherein
the polygon-shaped top and bottom walls are quadrilateral-shaped.

* * * * *